(12) United States Patent
Kwak

(10) Patent No.: US 12,499,938 B2
(45) Date of Patent: Dec. 16, 2025

(54) SEMICONDUCTOR DEVICE FOR IMPROVING PERFORMANCE IN CONTINUOUS READ AND OPERATION METHOD OF SEMICONDUCTOR DEVICE

(71) Applicant: SK hynix Inc., Icheon-si (KR)

(72) Inventor: Dong Hun Kwak, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 225 days.

(21) Appl. No.: 18/327,783

(22) Filed: Jun. 1, 2023

(65) Prior Publication Data
US 2024/0274188 A1 Aug. 15, 2024

(30) Foreign Application Priority Data
Feb. 13, 2023 (KR) .................. 10-2023-0018633

(51) Int. Cl.
*G11C 11/56* (2006.01)
*G11C 16/08* (2006.01)
*G11C 16/24* (2006.01)
*G11C 16/26* (2006.01)

(52) U.S. Cl.
CPC ...... *G11C 11/5642* (2013.01); *G11C 11/5671* (2013.01); *G11C 16/08* (2013.01); *G11C 16/24* (2013.01); *G11C 16/26* (2013.01)

(58) Field of Classification Search
CPC . G11C 11/5642; G11C 11/5671; G11C 16/08; G11C 16/24; G11C 16/26
USPC ...................................... 365/185.03
See application file for complete search history.

(56) References Cited

U.S. PATENT DOCUMENTS

| 11,011,239 | B2 | 5/2021 | Shibata et al. |
| 11,355,202 | B2 | 6/2022 | Shibata et al. |
| 2021/0020217 | A1* | 1/2021 | Lu .......................... G11C 29/52 |
| 2021/0103494 | A1* | 4/2021 | Zhang .................. G06F 11/1068 |

FOREIGN PATENT DOCUMENTS

KR 102104833 B1 6/2020

* cited by examiner

*Primary Examiner* — Amir Zarabian
*Assistant Examiner* — Daniel John King
(74) *Attorney, Agent, or Firm* — WILLIAM PARK AND ASSOCIATES LTD.

(57) ABSTRACT

A semiconductor device includes a page buffer array and a continuous read determination circuit configured to determine a continued read request for pages in which encoded data are stored, based on an address and a command that are received from a host. When it is determined that a request that is received from the host is the continued read request, the page buffer array is controlled to sense and store coding data of a page in which the coding data have been stored and to use the sensed coding data in a subsequent read operation.

17 Claims, 9 Drawing Sheets

FIG. 3

| | | |
|---|---|---|
| Even cell plug | | |
| Odd cell plug | | |
| 3rd Page Data | 0 / 1 | 0 / 1 |
| Coding Data | 0 (1st/5th Page Coding O) | 1 (1st/5th Page Coding X) |

SEMICONDUCTOR DEVICE FOR IMPROVING PERFORMANCE IN CONTINUOUS READ AND OPERATION METHOD OF SEMICONDUCTOR DEVICE

CROSS-REFERENCE TO RELATED APPLICATION

This application claims priority under 35 U.S.C. § 119 to Korean Patent Application No. 10-2023-0018633 filed on Feb. 13, 2023, which is incorporated herein by reference in its entirety.

BACKGROUND

1. Technical Field

Embodiments relate to an integrated circuit technology and, more particularly, to a semiconductor device for improving performance in a continuous read operation and an operating method of the semiconductor device.

2. Related Art

As electronic devices are reduced in size, have lower power consumption and higher performance, and are diversified, a semiconductor device capable of storing information is required for various electronic devices, such as computers and portable communication devices. The semiconductor device may be basically classified as a volatile memory device or a nonvolatile memory device. The volatile memory device has a fast data processing speed, but has a disadvantage in that the volatile memory device needs to be continuously supplied with power in order to maintain data that has been stored in the volatile memory device. The nonvolatile memory device does not need to be continuously supplied with power in order to maintain data that has been stored in the nonvolatile memory device, but has a disadvantage in that the nonvolatile memory device has a slow data processing speed.

In order to deploy more memory cells in the same area of a nonvolatile memory device, a technology for forming a plurality of memory cells by cutting one hole is being developed.

Furthermore, research on the development of a technology for storing multi-bit data in two memory cells is being carried out.

SUMMARY

In an embodiment, a semiconductor device may include a page buffer array and a continuous read determination circuit configured to determine a continued read request for pages in which encoded data are stored, based on an address and a command that are received from a host. When it is determined that a request that is received from the host is the continued read request, the page buffer array may be controlled to sense and store coding data of a page in which the coding data have been stored and to use the sensed coding data in a subsequent read operation.

In an embodiment, a semiconductor device may include memory cells including (N+1) pages in which data of N pages have been encoded, distributed, and stored, and a page buffer array configured to read coding data from the memory cells including a page in which the coding data have been stored, among the (N+1) pages, when a continued read request for the data of the N pages is received and configured to decode data of remaining pages, among the (N+1) pages, by using the coding data.

In an embodiment, an operating method of a semiconductor device may include receiving a continued read request for a pair of identical memory cells, determining coding data that have been stored in the pair of memory cells, sensing data except the coding data, among the data that have been stored in the pair of memory cells, and operating the data that have been sensed in the sensing of the data and the coding data.

BRIEF DESCRIPTION OF THE DRAWINGS

FIG. 3 is a diagram for describing the reading of data from a memory cell by a semiconductor device according to an embodiment of the present disclosure.

DETAILED DESCRIPTION

Hereinafter, embodiments according to the technical spirit of the present disclosure are described with reference to the accompanying drawings.

Some embodiments of the present disclosure may provide a semiconductor device for improving read performance when a continued read request is made, and an operating method of the semiconductor device.

It is possible to improve read performance of the semiconductor device when a continued read request for the same cell is made.

Figure 1:
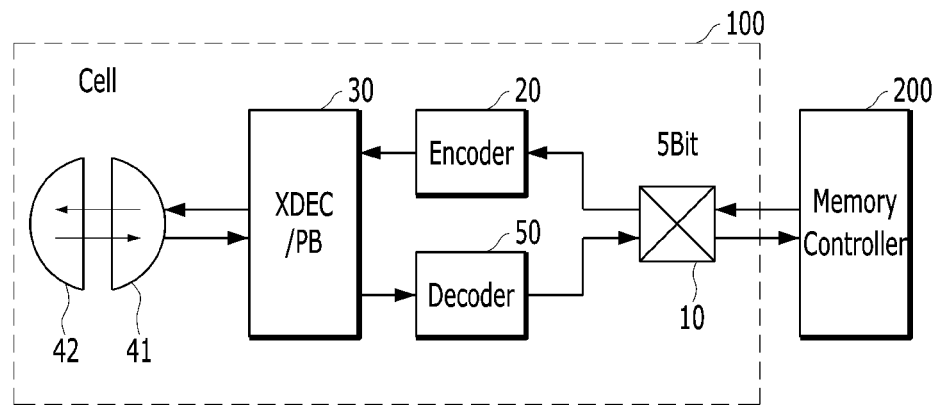
FIG. 1 is a diagram for schematically describing a semiconductor device according to an embodiment of the present disclosure.

FIG. 1 is a diagram for schematically describing a semiconductor device according to an embodiment of the present disclosure.

Referring to FIG. 1, a semiconductor device 100 according to an embodiment of the present disclosure may be configured to store multi-bit data in a pair of memory cells including a first memory cell 41 and a second memory cell 42 and to output the multi-bit data. For example, the semiconductor device 100 may receive multi-bit data having 5 bits from a host 200, and may store the multi-bit data having 5 bits in the memory cells 41 and 42 by distributing the multi-bit data having 5 bits. Furthermore, the semiconductor device 100 may restore, to multi-bit data having 5 bits, data that have been distributed and stored in the memory cells 41 and 42, and may transmit the restored data to the host 200.

The semiconductor device 100 according to an embodiment of the present disclosure may include a data input and output circuit 10, an encoder 20, a data transfer circuit 30, the pair of memory cells including the first memory cell 41 and the second memory cell 42, and a decoder 50. In this case, the semiconductor device 100 illustrated in FIG. 1 may be a component of a semiconductor device, which has been illustrated as an embodiment for implementing an operation of storing received multi-bit data in the memory cells 41 and 42 by distributing the multi-bit data, restoring data that has been stored in the memory cells 41 and 42, and outputting the restored data.

The data input and output circuit 10 may receive multi-bit data (e.g., 5-bit data) from the host 200 (e.g., a memory controller).

The encoder 20 may distribute 5-bit data so that the 5-bit data is stored in the pair of memory cells including first memory cell 41 and second memory cell 42, and may encode the distributed data if necessary.

The data transfer circuit 30 may transfer distributed data to the memory cells 41 and 42 so that the distributed data is stored in the memory cells 41 and 42, respectively. Furthermore, the data transfer circuit 30 may transfer, to the decoder 50, data that has been stored in the memory cells 41 and 42. In this case, the data transfer circuit 30 may include a row decoder (XDEC) and a page buffer (PB) capable of selecting the memory cells 41 and 42 and sensing the memory cells 41 and 42 that have been selected.

The pair of memory cells may include a first memory cell 41 and a second memory cell 42. For example, each of the first and second memory cells 41 and 42 may include a multi-level cell (MLC). The pair of memory cells may be memory cells that have been formed by cutting one memory cell. The first memory cell 41 may include an odd plug cell. The second memory cell 42 may include an even plug cell.

The decoder 50 may restore, to 5-bit data, the data (e.g., data that have been distributed and stored) that have been transferred by the data transfer circuit 30.

The data that has been restored by the decoder 50 may be output to the host 200 through the data input and output circuit 10.

Figure 2:
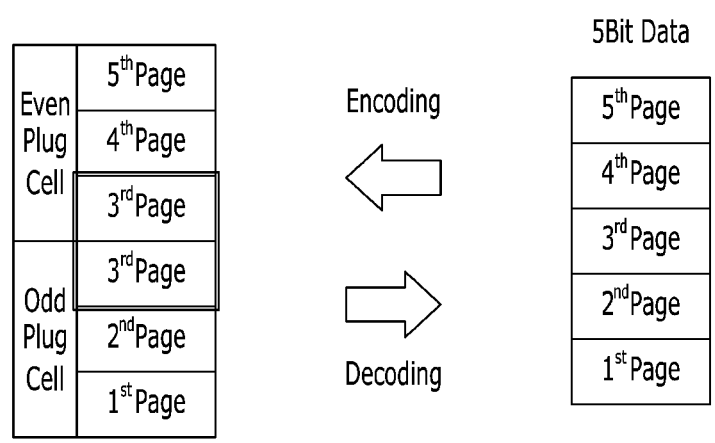
FIG. 2 is a diagram for schematically describing the input and output of data by a semiconductor device according to an embodiment of the present disclosure.

FIG. 2 is a diagram for schematically describing the input and output of data by a semiconductor device according to an embodiment of the present disclosure. FIG. 2 is a diagram for schematically describing an operation of distributing multi-bit data in order to store the multi-bit data in a pair of memory cells and encoding the distributed data and an operation of restoring, to the multi-bit data, data that have been stored in the pair of memory cells. Accordingly, it is to be noted that FIG. 2 is not limited to a method of distribution data, a method of encoding data, and a method of restoring data. Furthermore, FIG. 2 describes multi-bit data having 5 bits as an example, but does not limit multi-bit data to 5-bit data. For example, the semiconductor device 100 may be configured to store data in memory cells in a page unit and to restore and output the stored data. Accordingly, one page illustrated in FIG. 2 may be a data unit by which the semiconductor device 100 processes data at once.

Referring to FIG. 2, 5-bit multi-bit data (hereinafter referred to as "5-bit data") may include five pages (i.e., a 1st page, a 2nd page, a 3rd page, a 4th page, and a 5th page). Furthermore, each of the first and second memory cells (i.e., the odd plug cell and the even plug cell) may store three pages as a least significant bit (LSB) data (LSB data), a central significant bit (CSB) data (CSB data), and a most significant bit (MSB) data (MSB data).

The 5-bit data may include first to fifth pages (i.e., the $1^{st}$ page, the 2 nd page, the 3rd page, the 4th page, and the 5th page). Each of the first to fifth pages (i.e., the 1st page, the 2 nd page, the 3 rd page, the 4th page, and the 5th page) may have a level corresponding to the level of each bit of the 5-bit data.

The 5-bit data may be distributed to the first to third pages (i.e., the $1^{st}$ page, the $2^{nd}$ page, and the $3^{rd}$ page) and the third to fifth pages (i.e., the $3^{rd}$ page, the $4^{th}$ page, and the $5^{th}$ page). The first to third pages (i.e., the $1^{st}$ page, the $2^{nd}$ page, and the $3^{rd}$ page) may be transferred to the first memory cell 41 (i.e., the odd plug cell), and may be stored as the LSB data, the CSB data, and the MSB data. The third to fifth pages (i.e., the $3^{rd}$ page, the $4^{th}$ page, and the $5^{th}$ page) may be transferred to the second memory cell 42 (i.e., the even plug cell), and may be stored as the LSB data, the CSB data, and the MSB data. For example, at least one of the three pages (i.e., the $1^{st}$ page, the $2^{nd}$ page, and the $3^{rd}$ page) that have been stored in the first memory cell 41 (i.e., the odd plug cell) may be encoded. At least one of the remaining two pages may store information in relation to whether data that has been stored in the second memory cell 42 (i.e., the even plug cell) has been encoded. At least one of the three pages (i.e., the $3^{rd}$ page, the $4^{th}$ page, and the $5^{th}$ page) that have been stored in the second memory cell 42 (i.e., the even plug cell) may be encoded. At least one of the remaining two pages may store information in relation to whether data that has been stored in the first memory cell 41 (i.e., the odd plug cell) has been encoded. More specifically, for example, the $1^{st}$ page to be stored as the LSB data of the first memory cell and the $5^{th}$ page to be stored as the MSB data of the second memory cell may be encoded. The information in relation to whether the 1st page and the 5th page have been encoded may be stored in the 3rd page that is stored in the first memory cell as the MSB data and may be stored in the $3^{rd}$ page that is stored in the second memory cell as the LSB data.

As described above, each of the first and second memory cells (i.e., the odd plug cell and the even plug cell) may store data (i.e., the $1^{st}$ page and the $5^{th}$ page) which may be encoded from original page, data (i.e., the $2^{nd}$ page and the $4^{th}$ page) having the same information as the original page, and data (i.e., the $3^{rd}$ page) including information in relation to whether the data has been encoded along with the original page. At this time, the levels of the $1^{st}$ page which may be encoded, that is, that is stored in the first memory cell (i.e., the odd plug cell) as the LSB data, and the $5^{th}$ page which may be encoded, that is, that is stored in the second memory cell (i.e., the even plug cell) as the MSB data, may be converted into levels different from the levels of original pages (i.e., the $1^{st}$ page and $5^{th}$ page of the 5-bit data). If the levels of the $1^{st}$ page and the $5^{th}$ page can be converted into the different levels, it may be determined that the $1^{st}$ page and the $5^{th}$ page have been encoded. Furthermore, information indicating that the levels of the first and fifth pages (i.e., the $1^{st}$ page and the $5^{th}$ page) that are stored in the first and second memory cells (i.e., the odd plug cell and the even plug cell), respectively, may be included in the MSB data (i.e., the $3^{rd}$ page) that is stored in the first memory cell (i.e., the odd plug cell) and the LSB data (i.e., the $3^{rd}$ page) that is stored in the second memory cell (i.e., the even plug cell).

The first to third pages (i.e., the $1^{st}$ page, the $2^{nd}$ page, and the $3^{rd}$ page) that are stored in the first memory cell (i.e., the odd plug cell) and the third to fifth pages (i.e., the $3^{rd}$ page, the $4^{th}$ page, and the $5^{th}$ page) that are stored in the second memory cell (i.e., the even plug cell) may be restored to the 5-bit data by decoding operation.

In order to restore the $1^{st}$ page of the 5-bit data, whether the $1^{st}$ page has been encoded may be determined by sensing the MSB data (i.e., the $3^{rd}$ page) of the first memory cell (i.e., the odd plug cell) and the LSB data (i.e., the $3^{rd}$ page) of the second memory cell (i.e., the even plug cell). The LSB data (i.e., the $1^{st}$ page) of the first memory cell (i.e., the odd plug cell) may be sensed. At this time, the level of the LSB data (i.e., the $1^{st}$ page) that is sensed from the first memory cell (i.e., the odd plug cell) may be converted or maintained based on whether the $1^{st}$ page has been encoded. For example, when the level of the LSB data (i.e., the $1^{st}$ page) that is sensed from the first memory cell (i.e., the odd plug cell) is a high level and it is determined the $1^{st}$ page has been encoded, the level of the $1^{st}$ page of the 5-bit data may be restored to a low level. When the level of the LSB data (i.e., the $1^{st}$ page) that is sensed from the first memory cell (i.e., the odd plug cell) is a high level and it is determined that the $1^{st}$ page has not been encoded, the level of the $1^{st}$ page of the 5-bit data may be restored to a high level.

In order to restore the $2^{nd}$ page of the 5-bit data, the CSB data (i.e., the $2^{nd}$ page) of the first memory cell (i.e., the odd plug cell) may be sensed. In this case, the results of the sensing of the CSB data (i.e., the $2^{nd}$ page) of the first memory cell (i.e., the odd plug cell) may be the $2^{nd}$ page of the 5-bit data.

In order to restore the $3^{rd}$ page of the 5-bit data, the MSB data (i.e., the $3^{rd}$ page) of the first memory cell (i.e., the odd plug cell) and the LSB data (i.e., the $3^{rd}$ page) of the second memory cell (i.e., the even plug cell) may be sensed. The $3^{rd}$ page of the 5-bit data may be restored based on a level obtained by sensing the MSB data (i.e., the $3^{rd}$ page) of the first memory cell (i.e., the odd plug cell) and the LSB data (i.e., the $3^{rd}$ page) of the second memory cell (i.e., the even plug cell).

In order to restore the $4^{th}$ page of the 5-bit data, the CSB data (i.e., the $4^{th}$ page) of the second memory cell (i.e., the even plug cell) may be sensed. In this case, the results of the sensing of the CSB data (i.e., the $4^{th}$ page) of the second memory cell (i.e., the even plug cell) may be the $4^{th}$ page of the 5-bit data.

In order to restore the $5^{th}$ page of the 5-bit data, whether the $5^{th}$ page has been encoded may be determined by sensing the MSB data (i.e., the $3^{rd}$ page) of the first memory cell (i.e., the odd plug cell) and the LSB data (i.e., the $3^{rd}$ page) of the second memory cell (i.e., the even plug cell). The MSB data (i.e., the $5^{th}$ page) of the second memory cell (i.e., the even plug cell) may be sensed. At this time, the level of the MSB data (i.e., the $5^{th}$ page) that is sensed from the second memory cell (i.e., the even plug cell) may be converted or maintained based on whether the $5^{th}$ page has been encoded. For example, if the level of the MSB data (i.e., the $5^{th}$ page) that is sensed from the second memory cell (i.e., the even plug cell) is a high level and it is determined that the $5^{th}$ page has been encoded, the level of the $5^{th}$ page of the 5-bit data may be restored to a low level. If the level of the MSB data (i.e., the $5^{th}$ page) that is sensed from the second memory cell (i.e., the even plug cell) is a high level and it is determined that the $5^{th}$ page has not been encoded, the level of the $5^{th}$ page of the 5-bit data may be restored to a high level.

As described above, in order to restore the first and fifth pages (i.e., the $1^{st}$ page and the $5^{th}$ page) of the 5-bit data which may be encoded and stored, it is necessary to sense the MSB data of the first memory cell (i.e., the odd plug cell) and the LSB data of the second memory cell (i.e., the even plug cell) in which information in relation to whether the first and fifth pages (i.e., the $1^{st}$ page and the $5^{th}$ page) have been encoded is stored. Furthermore, in order to restore the $3^{rd}$ page of the 5-bit data, it is necessary to sense the MSB data of the first memory cell (i.e., the odd plug cell) and the LSB data of the second memory cell (i.e., the even plug cell).

As a result, in order to restore the 5-bit data that have been distributed and stored in the first and second memory cells (i.e., the odd plug cell and the even plug cell), it is necessary to sense the MSB data of the first memory cell (i.e., the odd plug cell) and the LSB data of the second memory cell (i.e., the even plug cell) at least three times.

The semiconductor device according to an embodiment of the present disclosure can reduce the time necessary for the recovery of data, by first sensing data that includes information in relation to whether a page has been encoded, when multi-bit data that have been distributed and stored in the first and second memory cells (i.e., the odd plug cell and the even plug cell) are stored, storing the sensed data, and using the stored information when the encoded page is to be restored.

FIG. 3 is a diagram for describing the reading of data from a memory cell by a semiconductor device according to an embodiment of the present disclosure. In this case, FIG. 3 may be a diagram for describing an operation of determining whether the first and fifth pages (i.e., the $1^{st}$ page and the $5^{th}$ page) of original data (i.e., the 5-bit data) have been encoded by reading the results of the sensing of the MSB data of the first memory cell (i.e., the odd plug cell) and the results of the sensing of the LSB data of the second memory cell (i.e., the even plug cell) and an operation of restoring the $3^{rd}$ page of the original data (i.e., the 5-bit data).

As illustrated in FIG. 3, the semiconductor device according to an embodiment of the present disclosure may use the MSB data of the first memory cell (i.e., the odd plug cell) and the LSB data of the second memory cell (i.e., the even plug cell), in order to indicate whether the first and fifth pages (i.e., the $1^{st}$ page and the $5^{th}$ page) of the original data (i.e., the 5-bit data) have been encoded and the number of four cases of data (i.e., a high or low level) for the $3^{rd}$ page of the original data (i.e., the 5-bit data). In this case, whether the first and fifth pages (i.e., the $1^{st}$ page and the $5^{th}$ page) of the original data (i.e., the 5-bit data) have been encoded may be indicated as coding data. The number of four cases of the data (i.e., a high or low level) for the $3^{rd}$ page of the original data (i.e., the 5-bit data) may be indicated as $3^{rd}$ page data. When the level of the coding data is a high level 1, this may mean that the first and fifth pages (i.e., the $1^{st}$ page and the $5^{th}$ page) of the original data (i.e., the 5-bit data) have been encoded and stored as the LSB data of the first memory cell (i.e., the odd plug cell) and the MSB data of the second memory cell (i.e., the even plug cell), respectively.

Referring to FIG. 3, when both the levels of the MSB data of the first memory cell (i.e., the odd plug cell) and the LSB data of the second memory cell (i.e., the even plug cell) are each a low level, the level of the coding data may be a high level 1, and the level of the third page data (i.e., the $3^{rd}$ page data) of the original data (i.e., the 5-bit data) may be a low level 0.

When both the levels of the MSB data of the first memory cell (i.e., the odd plug cell) and the LSB data of the second memory cell (i.e., the even plug cell) are each a high level, the level of the coding data may be a high level 1, and the level of the third page data (i.e., the $3^{rd}$ page data) of the original data (i.e., the 5-bit data) may be a high level 1.

When the level of the MSB data of the first memory cell (i.e., the odd plug cell) is a low level 0 and the level of the LSB data of the second memory cell (i.e., the even plug cell) is a high level 1, the level of the coding data may be a low level 0, and the level of the third page data (i.e., the $3^{rd}$ page data) of the original data (i.e., the 5-bit data) may be a low level 0.

When the level of the MSB data of the first memory cell (i.e., the odd plug cell) is a high level 1 and the level of the LSB data of the second memory cell (i.e., the even plug cell) is a low level 0, the level of the coding data may be a low level 0, and the level of the third page data (i.e., the $3^{rd}$ page data) of the original data (i.e., the 5-bit data) may be a high level 1.

As a result, when the MSB data of the first memory cell (i.e., the odd plug cell) and the LSB data of the second memory cell (i.e., the even plug cell) have the same level, the level of the coding data may be a high level 1. When the MSB data of the first memory cell (i.e., the odd plug cell) and the LSB data of the second memory cell (i.e., the even plug cell) have different levels, the level of the coding data may be a low level 0.

Furthermore, regardless of the level of the coding data, the $3^{rd}$ page data of the original data (i.e., the 5-bit data) may have the same level as the MSB data of the first memory cell (i.e., the odd plug cell).

Accordingly, the semiconductor device according to an embodiment of the present disclosure may generate the coding data by comparing the MSB data of the first memory cell (i.e., the odd plug cell) and the LSB data of the second memory cell (i.e., the even plug cell), and may store the generated data.

Furthermore, after generating the coding data, the semiconductor device according to an embodiment of the present disclosure may output the MSB data of the first memory cell (i.e., the odd plug cell) as the 3 rd page of the original data (i.e., the 5-bit data).

Figure 4:
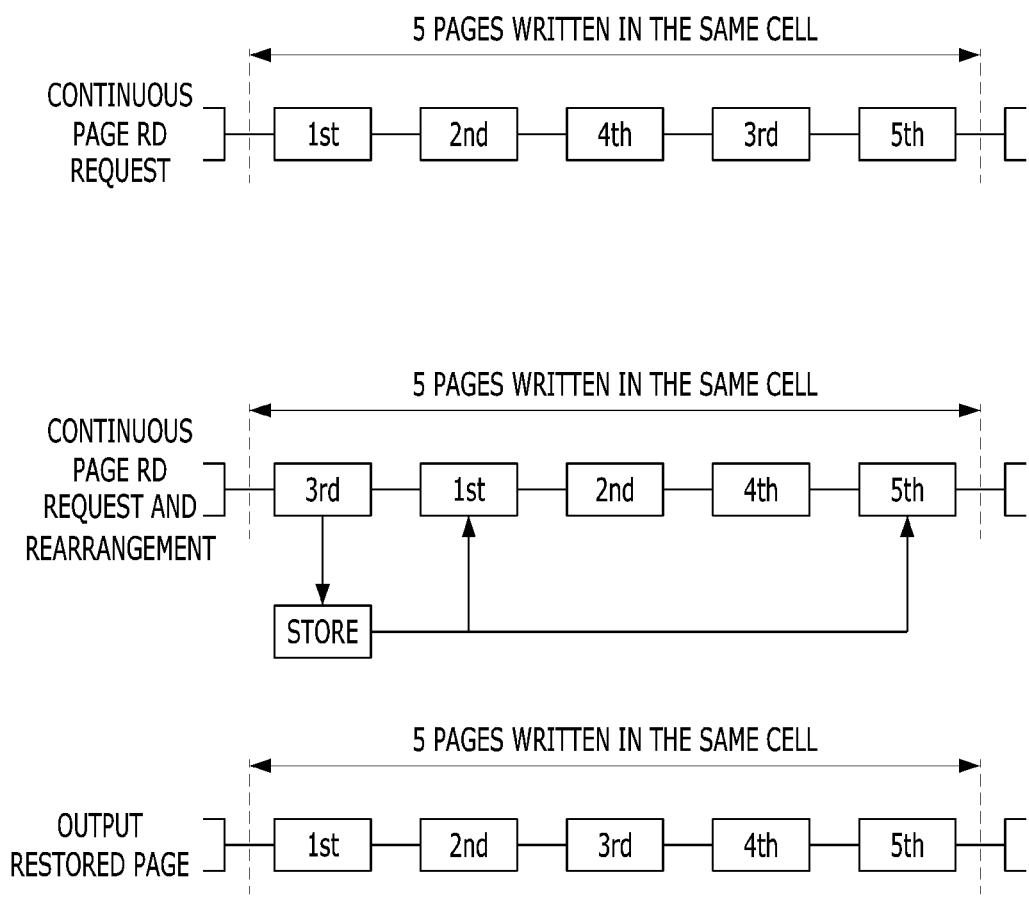
FIG. 4 is a diagram for describing a read operation of a semiconductor device according to an embodiment of the present disclosure.

FIG. 4 is a diagram for describing a read operation of a semiconductor device according to an embodiment of the present disclosure. In this case, FIG. 4 may be a diagram for describing a continued read request for pages in which encoded data are stored based on an address and a command that are received from the host 200 (e.g., the memory controller).

More specifically, FIG. 4 is a diagram for describing a read operation of the semiconductor device 100 when a continued read command to output multi-bit data that have been stored in the pair of memory cells in which the multi-bit data have been distributed and stored is received from the memory controller 200.

Referring to FIG. 4, a read request to continuously output the first to fifth pages (i.e., the $1^{st}$ page, the $2^{nd}$ page, the $3^{rd}$ page, the $4^{th}$ page, and the $5^{th}$ page) with respect to the pair of memory cells in which the original data including the first to fifth pages (i.e., the $1^{st}$ page, the $2^{nd}$ page, the $3^{rd}$ page, the $4^{th}$ page, and the $5^{th}$ page) have been distributed and stored may be continuously input to the semiconductor device 100.

The semiconductor device 100 according to an embodiment of the present disclosure may rearrange the read requests that have been continuously received from the memory controller 200, and may first restore the page (i.e., the $3^{rd}$ page) including information in relation to whether specific pages (e.g., the $1^{st}$ page and the $5^{th}$ page) have been encoded, which is included in the continued read request. For example, the semiconductor device 100 may restore the $3^{rd}$ page by first sensing and reading the MSB data of the first memory cell (i.e., the odd plug cell) and the LSB data of the second memory cell (i.e., the even plug cell). At this time, coding data including information in relation to whether specific pages (e.g., the $1^{st}$ page and the $5^{th}$ page) have been encoded may be read and stored. Thereafter, the restoration of the remaining pages (i.e., the $1^{st}$ page, the $2^{nd}$ page, the $4^{th}$ page, and the $5^{th}$ page) may be performed. In this case, if the specific pages (i.e., the $1^{st}$ page and the $5^{th}$ page) are to be restored, the stored coding data may be used.

When the restoration of the pages for the read request is completed, the first to fifth pages (i.e., the $1^{st}$ page, the $2^{nd}$ page, the $3^{rd}$ page, the $4^{th}$ page, and the $5^{th}$ page) may be transmitted to the memory controller 200 sequentially as in the sequence of the read requests that have been received from the memory controller 200.

Figure 5:
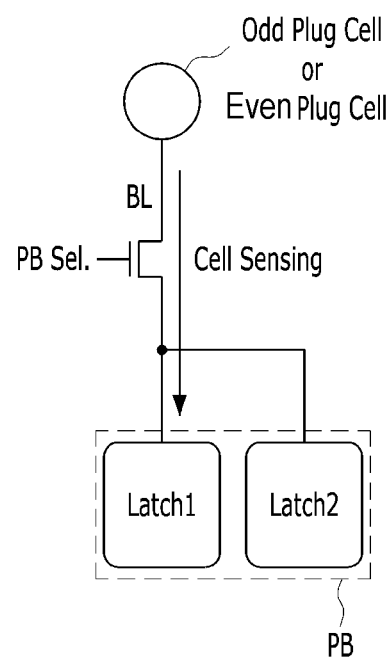
FIGS. 5 to 7 are diagrams for describing an operation of a page buffer of a semiconductor device according to an embodiment of the present disclosure.
Figure 6:
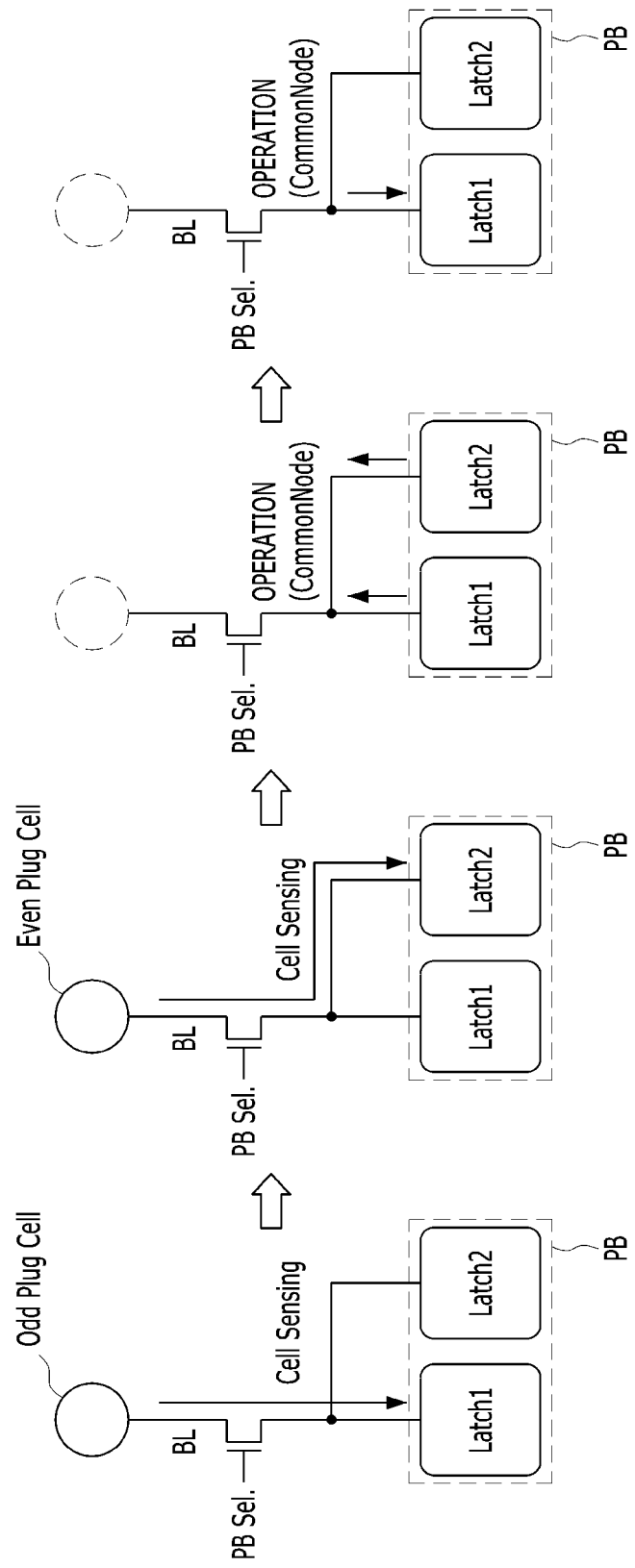
Figure 7:
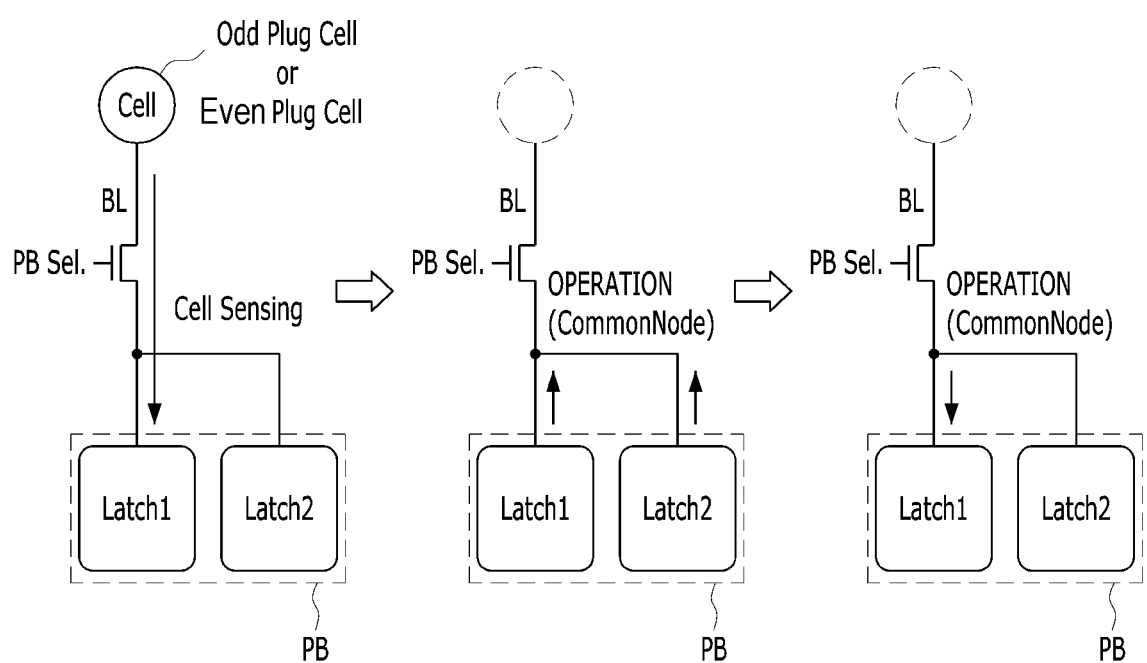

FIGS. 5 to 7 are diagrams for describing an operation of a page buffer of a semiconductor device according to an embodiment of the present disclosure. The page buffer may be selected, for example, by a transistor operating as a switch receiving a page buffer select signal PB Sel at its gate.

FIG. 5 may be a diagram for describing an operation of restoring pages of stored original data (i.e., the 5-bit data) that have been stored in first and second memory cells (i.e., an odd plug cell and an even plug cell) without being encoded.

FIG. 5 is a diagram for describing an operation of the page buffer PB, for restoring the $2^{nd}$ page and $4^{th}$ page of the original data (i.e., the 5-bit data).

Referring to FIG. 5, the page buffer PB may include first and second latches Latch1 and Latch2 that are connected to a common node, indicated as CommonNode in FIGS. 5 and 6.

The first latch Latch1 may sense and store the data of a selected memory cell, among the first memory cell (i.e., the odd plug cell) and the second memory cell (i.e., the even plug cell). The sensing of data stored in a selected memory cell is indicated as Cell Sensing in FIGS. 5, 6, and 7.

For example, the first latch Latch1 may sense and store the CSB data of the first memory cell (i.e., the odd plug cell). In this case, the CSB data of the first memory cell (i.e., the odd plug cell) that has been stored in the first latch Latch1 may be output as the $2^{nd}$ page of the original data (i.e., the 5-bit data).

Furthermore, the first latch Latch1 may sense and store the CSB data of the second memory cell (i.e., the even plug cell). In this case, the first latch Latch1 may output the stored CSB data of the second memory cell (i.e., the even plug cell) as the $4^{th}$ page of the original data (i.e., the 5-bit data).

As a result, the second and fourth pages (i.e., the $2^{nd}$ page and the $4^{th}$ page) that are stored in the first and second memory cells (i.e., the odd plug cell and the even plug cell) without being encoded, among the original data (i.e., the 5-bit data), may be output as the results of the sensing of the first and second memory cells (i.e., the odd plug cell and the even plug cell).

FIG. 6 is a diagram for describing an operation of a page buffer PB that performs an operation of determining coding data.

Referring to FIG. 6, the page buffer PB may include first and second latches Latch1 and Latch2 that are connected to a common node. In this case, the page buffer PB may perform various operations on values that have been stored in the first and second latches Latch1 and Latch2 by using the common node. In FIG. 6, the page buffer PB may perform a comparison operation of comparing whether values that have been stored in the first and second latches Latch1 and Latch2 are identical with each or are not identical with each by using the common node, and may form the level of the common node as a level corresponding to a result of the comparison operation.

One latch (e.g., the first latch Latch1), among the first and second latches Latch1 and Latch2, may sense and store the MSB data of a first memory cell (i.e., an odd plug cell).

The other latch (e.g., the second latch Latch2), among the first and second latches Latch1 and Latch2, may sense and store the LSB data of a second memory cell (i.e., an even plug cell).

The page buffer PB may compare and operate the results of the sensing that have been stored in the first and second latches Latch1 and Latch2, respectively, through the common node. At this time, the level of the common node may correspond to a level corresponding to the results of the comparison and operation.

For example, when the results of the sensing that have been stored in the first and second latches Latch1 and Latch2, respectively, are identical with each other, the level of the common node may be a high level. When the results of the sensing that have been stored in the first and second latches Latch1 and Latch2, respectively, are different from each other, the level of the common node may be a low level.

The level of the common node that has been determined through the comparison operation may be stored in the second latch Latch2 as coding data.

Furthermore, the results of the sensing of the MSB data of the first memory cell (i.e., the odd plug cell), which has been stored in the first latch Latch1, may be output as the $3^{rd}$ page of the original data (i.e., the 5-bit data).

FIG. 7 is a diagram for describing an operation of a page buffer PB that restores the first and fifth pages (i.e., the $1^{st}$ page and the $5^{th}$ page) of the original data (i.e., the 5-bit data) by using coding data.

Referring to FIG. 7, the page buffer PB may include first and second latches Latch1 and Latch2 that are connected to a common node. In this case, the page buffer PB may perform various operations on values that have been stored in the first and second latches Latch1 and Latch2 by using the common node. In FIG. 7, the page buffer PB may perform an operation of inverting or maintaining a value that has been stored in the first latch Latch1, based on a value that has been stored in the second latch Latch2, by using the common node.

One latch (e.g., the first latch Latch1), among the first and second latches Latch1 and Latch2, may sense and store the LSB data of a first memory cell (i.e., an odd plug cell) or the MSB data of a second memory cell (i.e., an even plug cell). For example, in order to restore the $1^{st}$ page of the original data (i.e., the 5-bit data), the first latch Latch1 may sense and store the LSB data of the first memory cell (i.e., the odd plug cell). Furthermore, in order to restore the $5^{th}$ page of the original data (i.e., the 5-bit data), the first latch Latch1 may sense and store the MSB data of the second memory cell (i.e., the even plug cell).

The other latch (e.g., the second latch Latch2), among the first and second latches Latch1 and Latch2, may store coding data.

The page buffer PB may operate values that have been stored in the first and second latches Latch1 and Latch2, respectively. At this time, the level of the common node may be converted into a level corresponding to the results of the operation.

For example, when the level of the coding data that has been stored in the second latch Latch2 is a high level, the level of the common node may be the same as a value (or level) that has been stored in the first latch Latch1. When the level of the coding data that has been stored in the second latch Latch2 is a low level, the level of the common node may be different from a value (or level) that has been stored in the first latch Latch1.

The level of the common node that has been determined through an operation may be stored in the first latch Latch1.

The level that has been stored in the first latch Latch1 may be output as the $1^{st}$ page or $5^{th}$ page of the original data (i.e., the 5-bit data).

Figure 8:
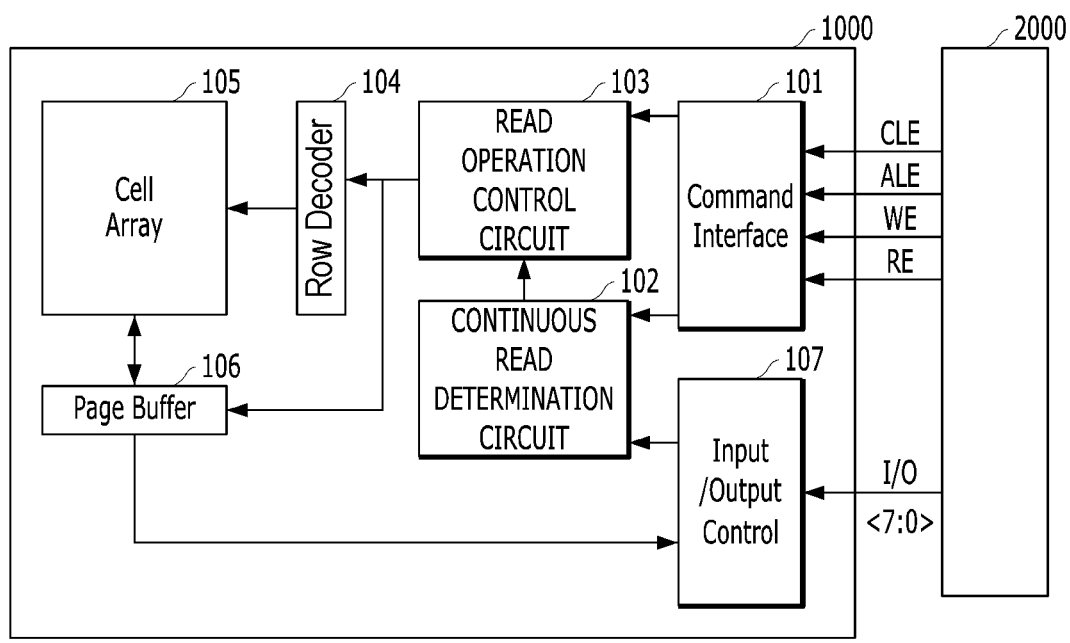
FIG. 8 is a diagram for describing the construction of a semiconductor device according to an embodiment of the present disclosure.

FIG. 8 is a diagram for describing the construction of a semiconductor device according to an embodiment of the present disclosure.

Referring to FIG. 8, a semiconductor device 1000 according to an embodiment of the present disclosure may include a command interface 101, a continuous read determination circuit 102, a read operation control circuit 103, a row decoder 104, a cell array 105, a page buffer array 106, and an input/output control circuit 107.

The command interface 101 may determine a read request that is made from a memory controller 2000 to the semiconductor device 1000, based on command signals CLE, ALE, WE, and RE from the memory controller 2000.

The input/output control circuit 107 may receive an address from the memory controller 2000 through input and output lines I/O21 0:7>. Furthermore, the input/output control circuit 107 may transmit and receive data to and from the memory controller 2000 through the input and output lines I/O<0:7>.

The continuous read determination circuit 102 may determine whether a read request that is received through the command interface 101 is a continued read request for the same address, based on an address that is received through the input/output control circuit 107 and the read request that is received through the command interface 101. In this case, the continued read request for the same address may mean that a read request for a pair of memory cells that distribute and store original data is repeatedly received.

The read operation control circuit 103 may control the row decoder 104 and the page buffer array 106 so that a read operation for a pair of memory cells that has distributed and stored original data is continuously performed when a continued read request for the same address is made. In this case, the page buffer array 106 may include multiple page buffers. Each of the multiple pages may be controlled by the read operation control circuit so that coding data that have been stored in the pair of memory cells are first sensed regardless of the sequence of the continued read request, the sensed coding data are stored in a specific latch (e.g., a second latch, among the first and second latches) of each page buffer, and original data is restored by using the coding data that has been stored in the specific latch.

The input/output control circuit 107 may rearrange pages that have been restored from the page buffer array 106 so that the pages are matched with the sequence of a continued read request, and may transmit the pages to the memory controller 2000.

Figure 9:
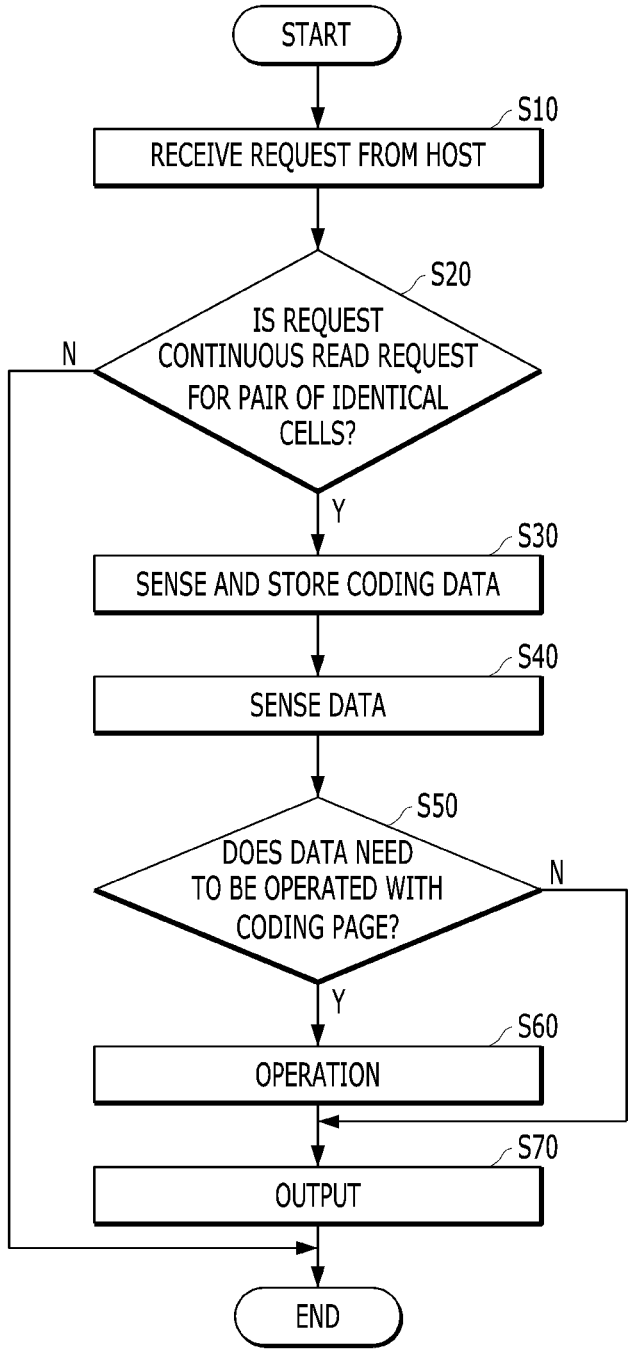
FIG. 9 is a diagram for describing an operating method of a semiconductor device according to an embodiment of the present disclosure.

FIG. 9 is a diagram for describing an operating method of a semiconductor device according to an embodiment of the present disclosure.

Referring to FIG. 9, the operating method of the semiconductor device may include a host request reception operation S10, a host request determination operation S20, a coding data determination and storage operation S30, a data sensing operation S40, an operation-required determination operation S50, an operation execution operation S60, and an output operation S70.

The host request reception operation S10 may include an operation of receiving, by the semiconductor device, a request that is transmitted by the memory controller.

The host request determination operation S20 may include an operation of determining whether the request that has been received from the memory controller is a continued read request for a pair of memory cells in which original data have been distributed and stored.

If it is determined that the request is not the continued read request (N) in the host request determination operation S20, the operating method of the semiconductor device according to an embodiment of the present disclosure may be terminated.

If it is determined that the request is a continued read request (Y) in the host request determination operation S20, the coding data determination and storage operation S30 may be performed.

The coding data determination and storage operation S30 may include an operation of determining coding data that have been 10 stored in the pair of memory cells and storing the results of the determination. For example, the coding data determination and storage operation S30 may include an operation of determining coding data by comparing the MSB data of a first memory cell (i.e., an odd plug cell) and the LSB data of a second memory cell (i.e., an even plug 15 cell) and storing the coding data in the second latch Latch2.

The data sensing operation S40 may include an operation of sensing data that have been stored in the pair of memory cells. For example, the data sensing operation S40 may include an operation of sensing the LSB data or CSB data of the first memory cell (i.e., the odd 20 plug cell) or sensing the CSB data or MSB data of the second memory cell (i.e., the even plug cell) and storing the sensed data in a first latch.

The operation-required determination operation S50 may include an operation of determining data that requires an operation with the coding data, among the data that have been sensed in the data sensing operation S40. According to an embodiment of the present disclosure, the LSB data of the first memory cell (i.e., the odd plug cell) and the MSB data of the second memory cell (i.e., the even plug cell) may require an operation with the coding data.

If it is determined that the operation is required (Y) in the operation-required determination operation S50, the operation execution operation S60 may be performed. For example, when the data that have been sensed in the data sensing operation S40 is the LSB data of the first memory cell (i.e., the odd plug cell) or the MSB data of the second memory cell (i.e., the even plug cell) (Y), the operation execution operation S60 may be performed.

If it is determined that the operation is not required (N) in the operation-required determination operation S50, the output operation S70 may be performed. For example, when the data that have been sensed in the data sensing operation S40 is the CSB data of the first memory cell (i.e., the odd plug cell) or the CSB data of the second memory cell (i.e., the even plug cell) (N), the output operation S70 may be performed.

The operation execution operation S60 may include performing an operation of inverting the sensed LSB data of the first memory cell (i.e., the odd plug cell) or the sensed MSB data of the second memory cell (i.e., the even plug cell) based on the stored coding data. For example, when the level of the stored coding data is a low level, the operation execution operation S60 may include performing an operation of inverting the sensed LSB data of the first memory cell (i.e., the odd plug cell) or the sensed MSB data of the second memory cell (i.e., the even plug cell). When the level of the stored coding data is a high level, the operation execution operation S60 may further include performing an operation of maintaining the LSB data of the first memory cell (i.e., the odd plug cell) or the MSB data of the second memory cell (i.e., the even plug cell).

The output operation S70 may include an operation of rearranging the MSB data (e.g., corresponding to the $3^{rd}$ page of the original data) of the first memory cell (i.e., the odd plug cell), which have been stored in order to determine the coding data in the coding data determination and storage operation S30, the data (e.g., corresponding to the $1^{st}$ page or $5^{th}$ page of the original data) on which the operation has been performed in the operation execution operation S60, and the data (e.g., corresponding to the $2^{nd}$ page or $4^{th}$ page of the original data) that does not require the operation execution operation in the operation-required determination operation S50, based on an address according to the continued read request, and transmitting the data to the memory controller.

An operating method of a semiconductor device according to an embodiment of the present disclosure can perform an operation of determining coding data that have been stored in a pair of memory cells when a read request for the pair of memory cells in which original data have been distributed and stored is continuously received, and then restoring the original data.

Accordingly, the semiconductor device and the operating method of the semiconductor device according to embodiments of the present disclosure can reduce the time taken for a continued read request by using coding data that have been stored in the pair of memory cells when data that have been encoded and stored in the pair of memory cells are to be restored if original data have been distributed and stored in the pair of memory cells.

Although embodiments according to the technical spirit of the present disclosure have been described above with reference to the accompanying drawings, the embodiments have been provided to merely describe the present disclosure, and the present disclosure is not limited to the embodiments. A person having ordinary knowledge in the art to which the present disclosure pertains may substitute, modify, and/or change the embodiments in various ways without departing from the technical spirit of the present disclosure written in the claims. Such substitutions, modifications, and/or changes may be said to belong to the scope of the present disclosure.

What is claimed is:

1. A semiconductor device comprising:
   a page buffer array; and
   a continuous read determination circuit configured to determine a continued read request for pages in which encoded data are stored, based on an address and a command that are received from a host,
   wherein when it is determined that a request that is received from the host is the continued read request, the page buffer array is controlled to sense and store coding data of a page in which the coding data have been stored and to use the sensed coding data in a subsequent read operation.

2. The semiconductor device of claim 1, wherein:
   the page buffer array comprises multiple page buffers,
   each of the multiple page buffers comprises a first latch and a second latch,
   the first latch senses and stores data of a page for which a read operation has been requested, and
   the second latch stores the coding data.

3. The semiconductor device of claim 2, wherein each of the multiple page buffers inverts or maintains a value that has been stored in the first latch, based on the coding data that have been stored in the second latch.

4. A semiconductor device comprising:
memory cells comprising (N+1) pages in which data of N pages have been encoded, distributed, and stored; and
a page buffer array configured to read coding data from the memory cells comprising a page in which the coding data have been stored, among the (N+1) pages, when a continued read request for the data of the N pages is received and configured to decode data of remaining pages, among the (N+1) pages, by using the coding data.

5. The semiconductor device of claim 4, wherein the coding data is stored in the page buffer array during a read operation of the remaining pages.

6. The semiconductor device of claim 4, wherein:
the N pages comprise a first page, a second page, a third page, a fourth page, and a fifth page,
the memory cells comprise a first memory cell and a second memory cell,
the first and second memory cells each store three pages and the first and second memory cells combined store a total of the six pages,
the first memory cell stores data corresponding to the first, second, and third pages, and
the second memory cell stores data corresponding to the third, fourth, and fifth pages.

7. The semiconductor device of claim 6, wherein the page buffer array is configured to determine whether the first and fifth pages have been encoded by sensing the data corresponding to the third pages that have been distributed and stored in the first and second memory cells, respectively, and stores results of the determination.

8. The semiconductor device of claim 6, wherein:
the page buffer array comprises multiple page buffers,
each of the multiple page buffers comprises a first latch and a second latch that have been connected to a common node,
the first latch senses and stores the data corresponding to the third page that has been stored in the first memory cell, and
the second latch senses and stores the data corresponding to the third page that has been stored in the second memory cell.

9. The semiconductor device of claim 8, wherein each of the multiple page buffers forms a level of the common node based on a result of a comparison between a value that has been stored in the first latch and a value that has been stored in the second latch.

10. The semiconductor device of claim 9, wherein each of the multiple page buffers:

forms the level of the common node as a first level when the value that has been stored in the first latch and the value that has been stored in the second latch are identical with each other, and
forms the level of the common node as a second level when the value that has been stored in the first latch and the value that has been stored in the second latch are different from each other.

11. The semiconductor device of claim 10, wherein each of the multiple page buffers compares the value that has been stored in the first latch and the value that has been stored in the second latch, and then stores the level of the common node in the second latch as the coding data.

12. The semiconductor device of claim 6, wherein:
the page buffer array comprises multiple page buffers,
each of the multiple page buffers comprises a first latch and a second latch,
the first latch senses and stores data that has been stored in the first memory cell or the second memory cell, and
the second latch stores, as the coding data, a result of a determination of whether the first and fifth pages have been encoded.

13. The semiconductor device of claim 12, wherein each of the multiple page buffers restores the original data by inverting or maintaining a value that has been stored in the first latch, based on the coding data that has been stored in the second latch.

14. An operating method of a semiconductor device, the method comprising:
receiving a continued read request for a pair of identical memory cells;
determining coding data that have been stored in the pair of memory cells;
sensing data except the coding data, among the data that have been stored in the pair of memory cells; and
operating the data that have been sensed in the sensing of the data and the coding data.

15. The method of claim 14, wherein determining the coding data comprises first performing the determining of the coding data regardless of a sequence of the continued read request.

16. The method of claim 14, further comprising:
storing the coding data in a first latch, and
storing, in a second latch, the data that has been sensed in the sensing of the data.

17. The method of claim 16, wherein operating the data that has been sensed in the sensing of the data and the coding data comprises inverting or maintaining a value that has been stored in the second latch, based on a value that has been stored in the first latch.

* * * * *